(12) United States Patent
Lin

(10) Patent No.: US 11,780,125 B2
(45) Date of Patent: Oct. 10, 2023

(54) COMPOSITE AUTOMATIC PRODUCTION EQUIPMENT FOR IN-MOLD PLACEMENT PROCESS

(71) Applicant: Quanta Computer Inc., Taoyuan (TW)

(72) Inventor: Shu-Chen Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 154 days.

(21) Appl. No.: 17/378,010

(22) Filed: Jul. 16, 2021

(65) Prior Publication Data
US 2022/0288821 A1 Sep. 15, 2022

(30) Foreign Application Priority Data
Mar. 15, 2021 (TW) .................................. 110109200

(51) Int. Cl.
| B29C 43/34 | (2006.01) |
|---|---|
| B29C 43/20 | (2006.01) |
| B29C 43/58 | (2006.01) |
| B29C 43/50 | (2006.01) |

(52) U.S. Cl.
CPC ............ *B29C 43/34* (2013.01); *B29C 43/203* (2013.01); *B29C 43/50* (2013.01); *B29C 43/58* (2013.01); *B29C 2043/3466* (2013.01); *B29C 2043/5875* (2013.01)

(58) Field of Classification Search
None
See application file for complete search history.

(56) References Cited

U.S. PATENT DOCUMENTS

| 4,587,855 A * | 5/1986 | Yamada .................... G01L 5/10 73/862.451 |
|---|---|---|
| 5,218,756 A * | 6/1993 | Zaleski .................... B21J 15/10 29/818 |
| 2013/0022819 A1* | 1/2013 | Yano ..................... B32B 37/025 156/247 |

FOREIGN PATENT DOCUMENTS

| CN | 111823606 A | * 10/2020 |
|---|---|---|
| CN | 212121345 U | 12/2020 |
| JP | 60256994 A | 12/1985 |

(Continued)

OTHER PUBLICATIONS

Machine English translation of CN111823606, Accessed Feb. 7, 2023 (Year: 2020).*

*Primary Examiner* — Christopher T Schatz

(57) ABSTRACT

A composite automatic production equipment for in-mold placement process includes a upper stamping mold having a upper die plate and punches, a lower stamping mold having a lower die plate, a punching strip feeding device sending out a punching material strip to the lower stamping mold, an insulating-sheet feeding device feeding out an insulating-film material strip intersecting to the punching material strip. The insulating-film material strip includes a main material strip and insulating sheet sets that are adhesive and detachably arranged along the main material strip. When the upper and lower die plates are closed, the punches punch the punching material strip to form semi-finished products arranged in sequence, and one of the semi-finished products is pressed to adhere to one of the insulating sheet sets. When they are separated, the insulating sheet set on the semi-finished product is torn off from the insulating-film material strip.

10 Claims, 11 Drawing Sheets

(56) References Cited

FOREIGN PATENT DOCUMENTS

TW            M461492 U      9/2013

* cited by examiner

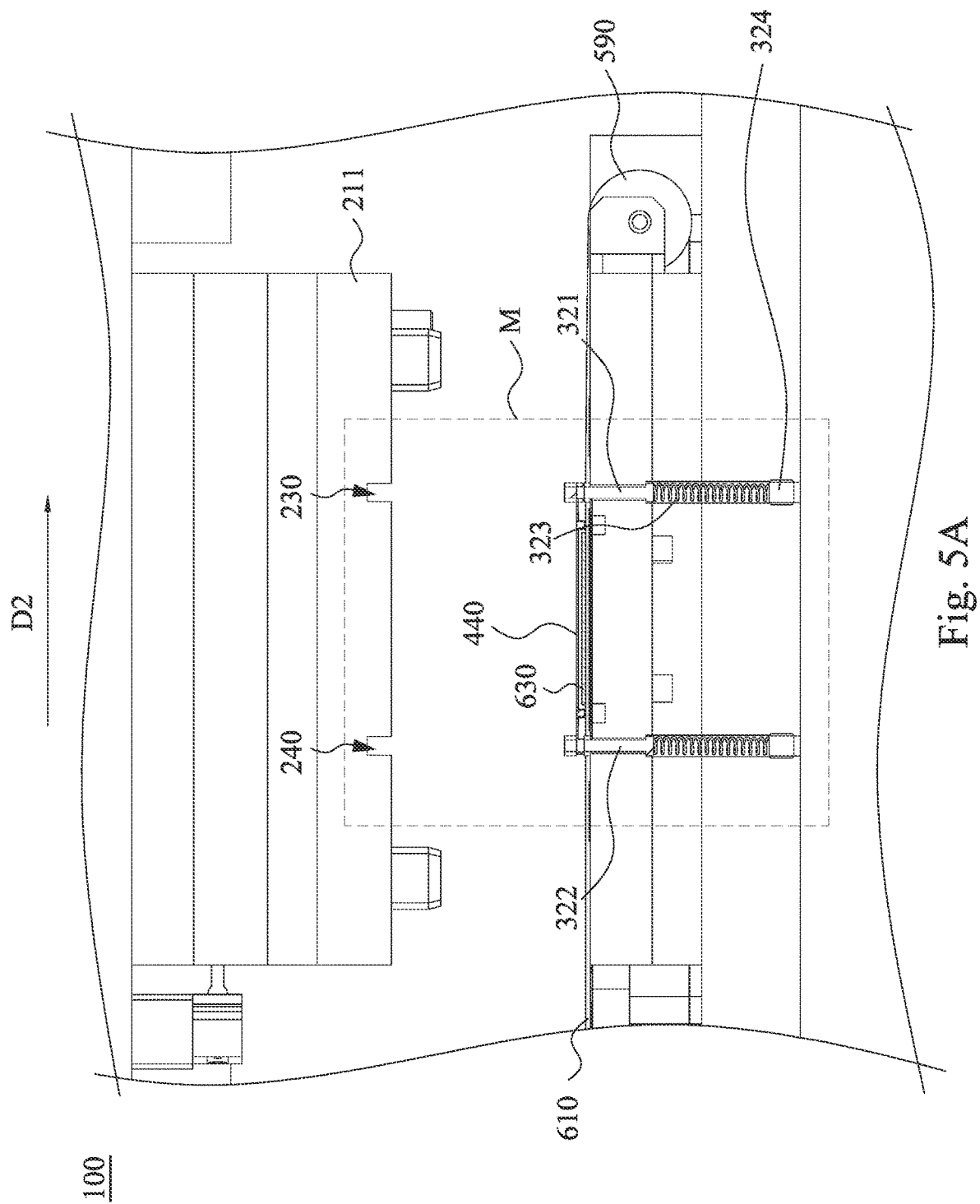

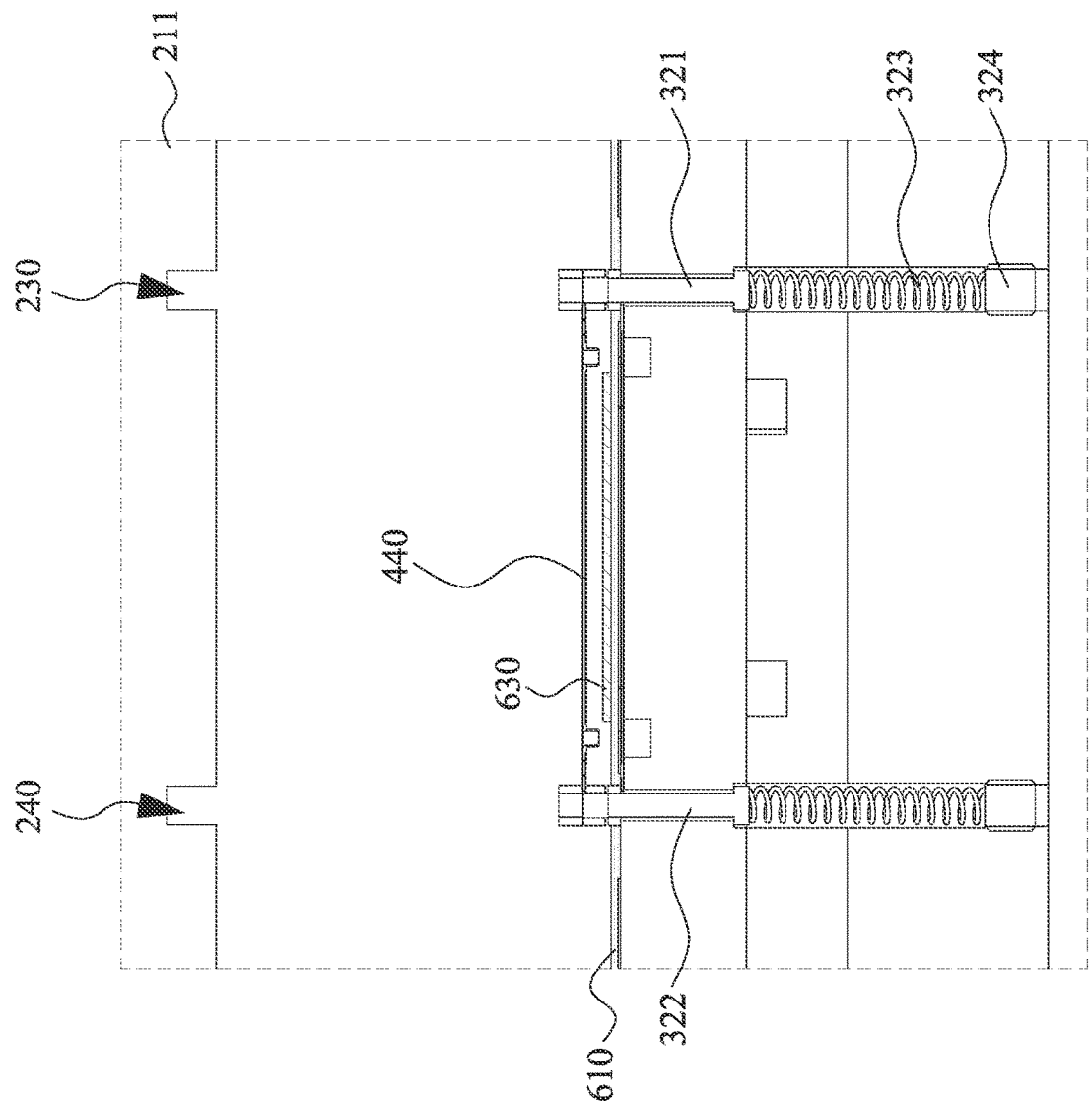

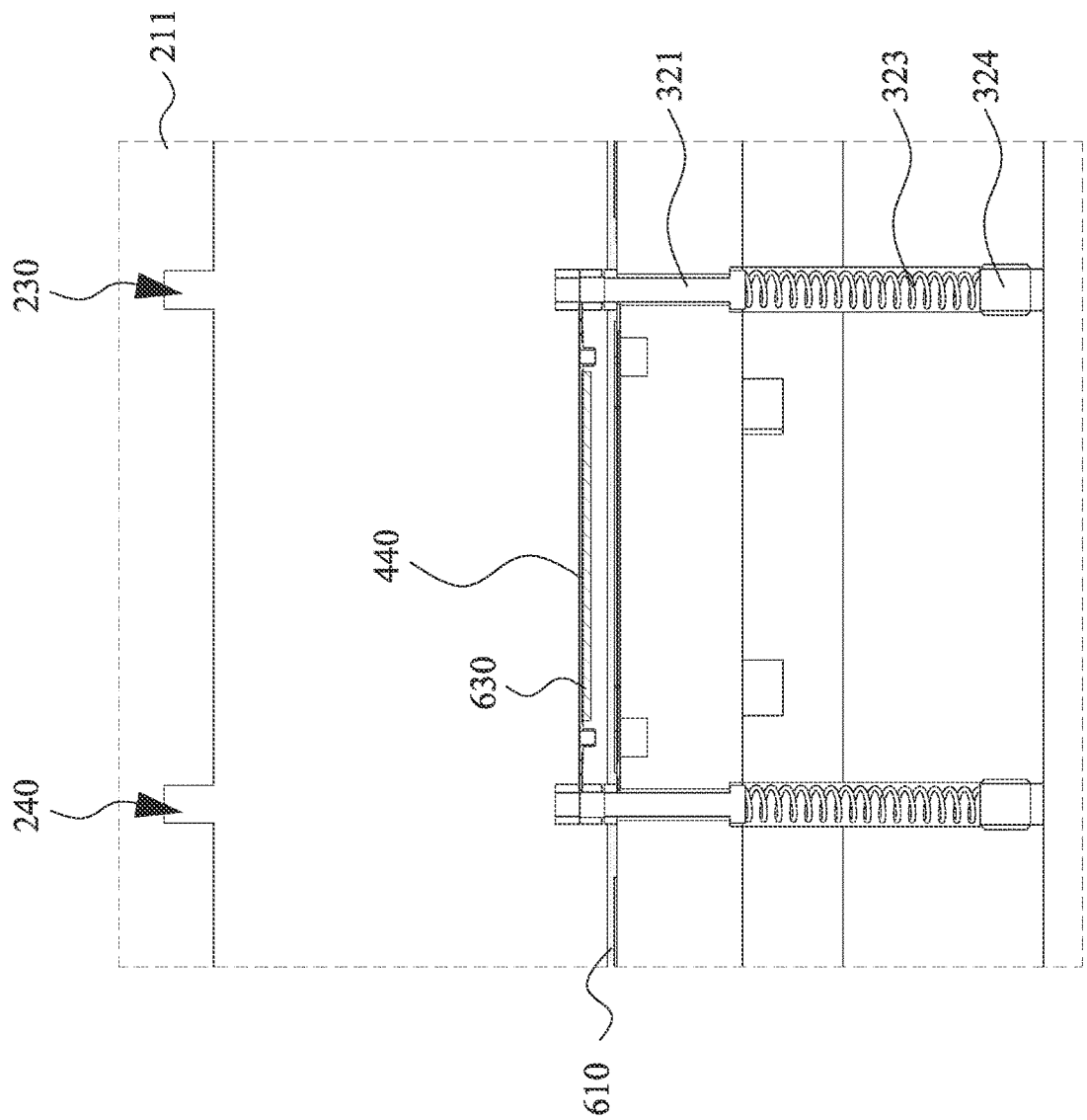

COMPOSITE AUTOMATIC PRODUCTION EQUIPMENT FOR IN-MOLD PLACEMENT PROCESS

RELATED APPLICATIONS

This application claims priority to Taiwan Application Serial Number 110109200, filed on Mar. 15, 2021, which is herein incorporated by reference.

BACKGROUND

Field of Disclosure

The present disclosure relates to automatic production equipment. More particularly, the present disclosure relates to automatic production equipment with an in-mold stamping and film-attaching composite process.

Description of Related Art

As labor costs increase, industries have introduced automated production equipment into the production process to replace labor-intensive manual operations. The economic benefits brought by the automated production equipment have become one of the keys to creating corporate value and enhancing industrial competitiveness. For example, the automated production equipment is used to integrate the stamping process and assembly in the production line, emphasized to cumbersome processing procedures, and high-efficient control through process integrations.

For example, in a normal stamping process, a stamping finished product is required to be done through multiple sets of molds or multiple engineering conversions. After a thin plate-shaped coil material is stamped into a semi-finished product, it must undergo multiple line changes and transmissions for moving to other station equipment for subsequent processing projects. For example, insulating sheets are respectively attached to each of the semi-finished products. In this way, if relying on manual management of each stage of the process totally, the waiting period for production-line replacement and inventory in shipment will reduce operating efficiency and increase material costs and extend delivery time.

SUMMARY

One aspect of the present disclosure is to provide a composite automatic production equipment for in-mold placement process which increases production efficiency thereof, so as to solve the aforementioned problems of the prior art.

In one embodiment of the present disclosure, the composite automatic production equipment for in-mold placement process includes a punching strip feeding device, a continual stamping mold group and an insulating-sheet feeding device. The punching strip feeding device continually sends out a punching material strip in a first direction. The continual stamping mold group includes a lower stamping mold and an upper stamping mold. The lower stamping mold includes a lower die plate and a strip-material delivery zone. The strip-material delivery zone is connected to the lower die plate and spaced with the lower die plate for providing the punching material strip to delivery therein. The upper stamping mold includes a upper die plate and a plurality of punches. The upper die plate is liftably disposed on the lower die plate. The punches are disposed on a material-departing plate of the upper die plate facing towards the lower die plate for synchronously punching out a plurality of semi-finished products arranged in sequence on the punching material strip when the upper die plate and the lower die plate are closed. The insulating-sheet feeding device is connected to the lower die plate for continually sending out an insulating-film material strip to the continual stamping mold group in a second direction intersecting to the first direction. The insulating-film material strip includes a main material strip passing through the lower die plate and the punching material strip, and a plurality of insulating sheet sets which are adhesive and detachably arranged along the main material strip. When the upper die plate and the lower die plate are closed, and one of the semi-finished products overlaps with one of the insulating sheet sets, the punching material strip is pressed down to the insulating-film material strip by the upper die plate, so that the one of the insulating-film material strips and the one of the semi-finished products overlapped with each other are adhered together, when the upper die plate and the lower die plate are separated, the insulating sheet set adhered on the semi-finished product is torn off from the main material strip of the insulating-film material strip.

Thus, through the construction of the embodiments above, the present disclosure does not need to transfer the semi-finished products to another work station for film-attaching process, that is, the film-attaching process can be completed synchronously in the stamping process. Therefore, not only the operating efficiency of the in-mold placement process can be improved, but also the operating cost can be reduced, and the delivery period can be shortened.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 5A is a partial cross-sectional view of a strip-holding floating guide tip assembly of the continual stamping mold group of FIG. 1.

FIG. 5B to FIG. 5D are continual operational schematic views of the strip-holding floating guide tip assembly in a zone M of FIG. 5A from the mold-closed status to the mold-opened status.

DESCRIPTION OF THE EMBODIMENTS

Figure 1:
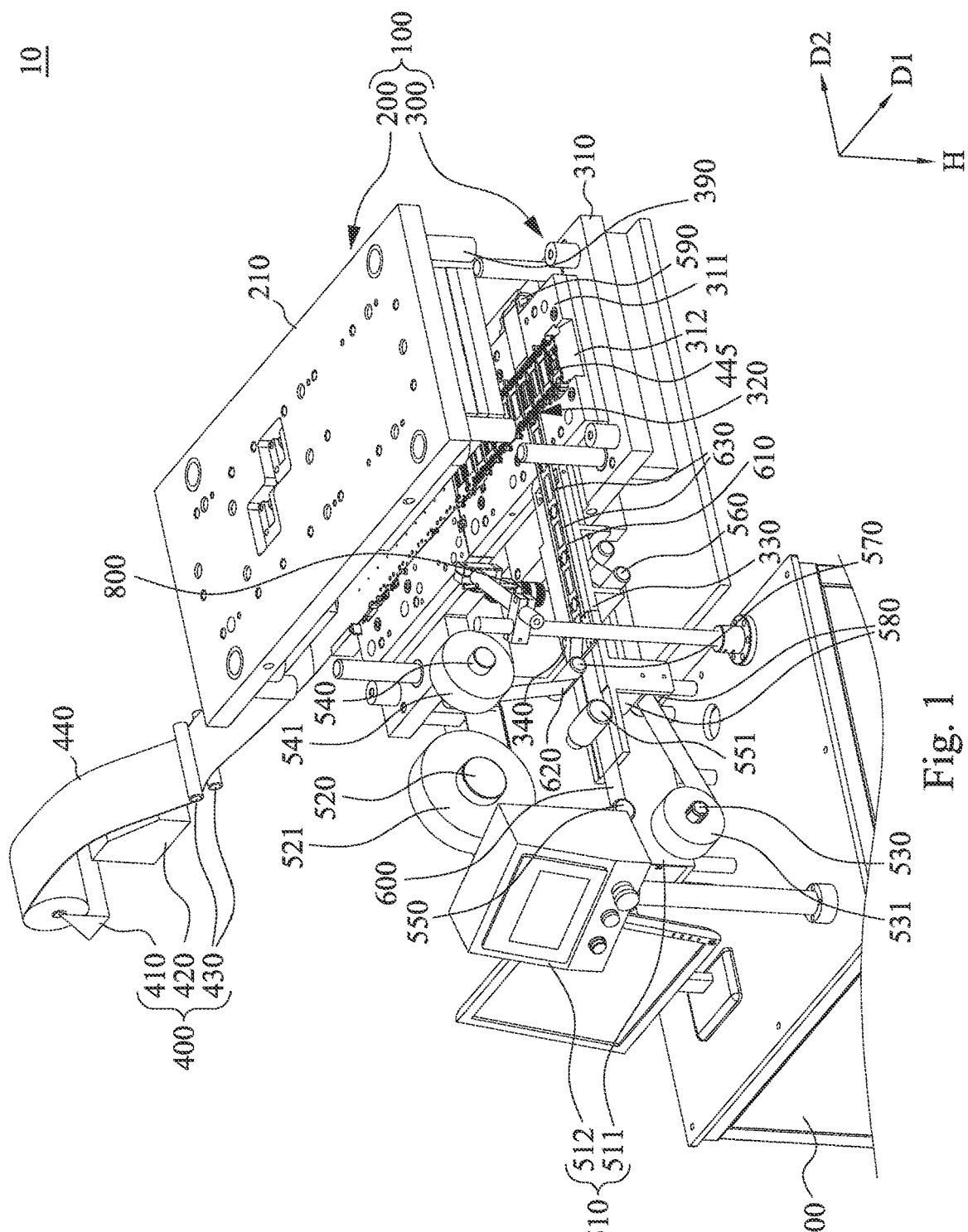
FIG. 1 is a perspective view of a composite automatic production equipment for in-mold placement process in a mold-opened status according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
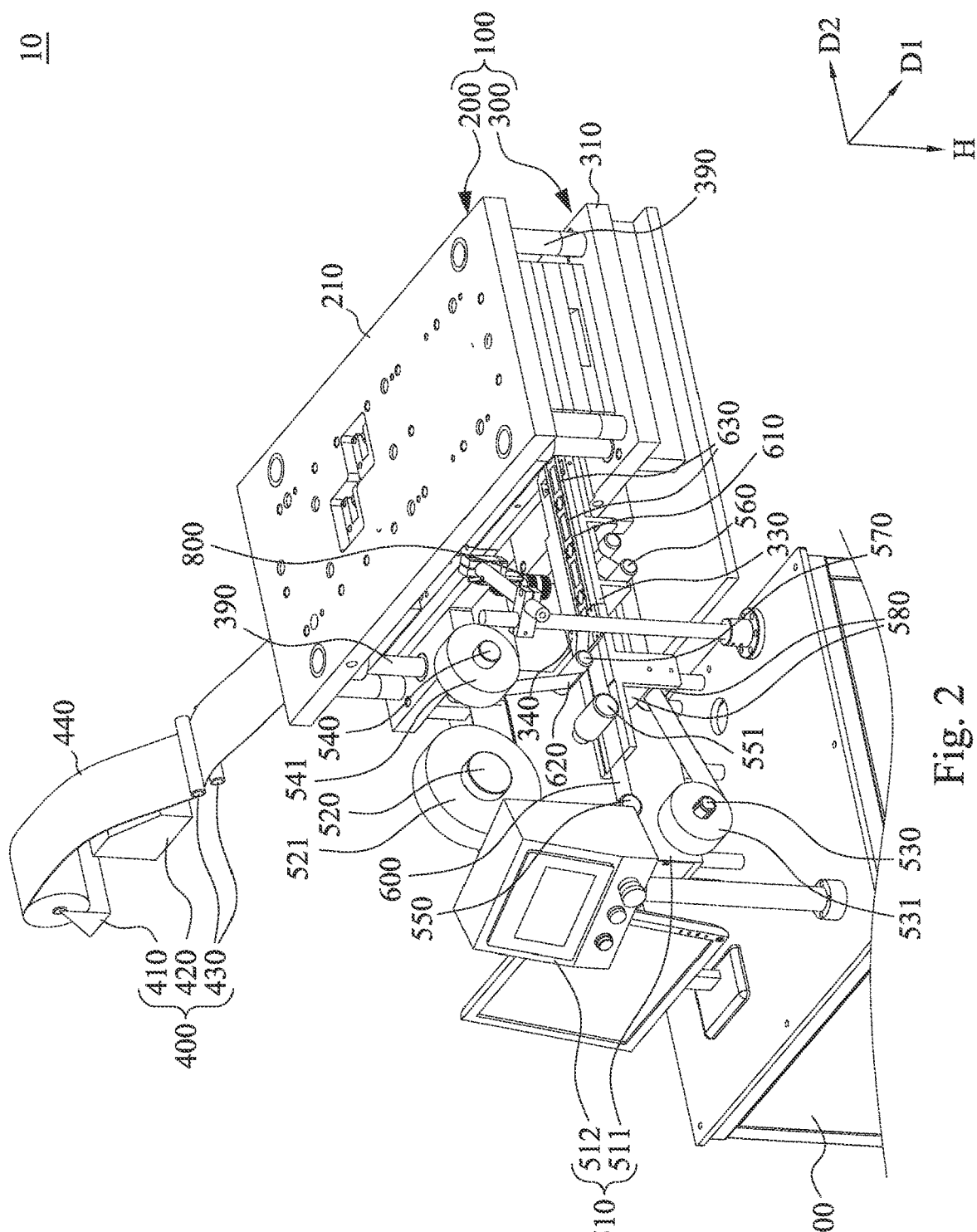
FIG. 2 is a perspective view of the composite automatic production equipment in a mold-closed status of FIG. 1.
Figure 3:
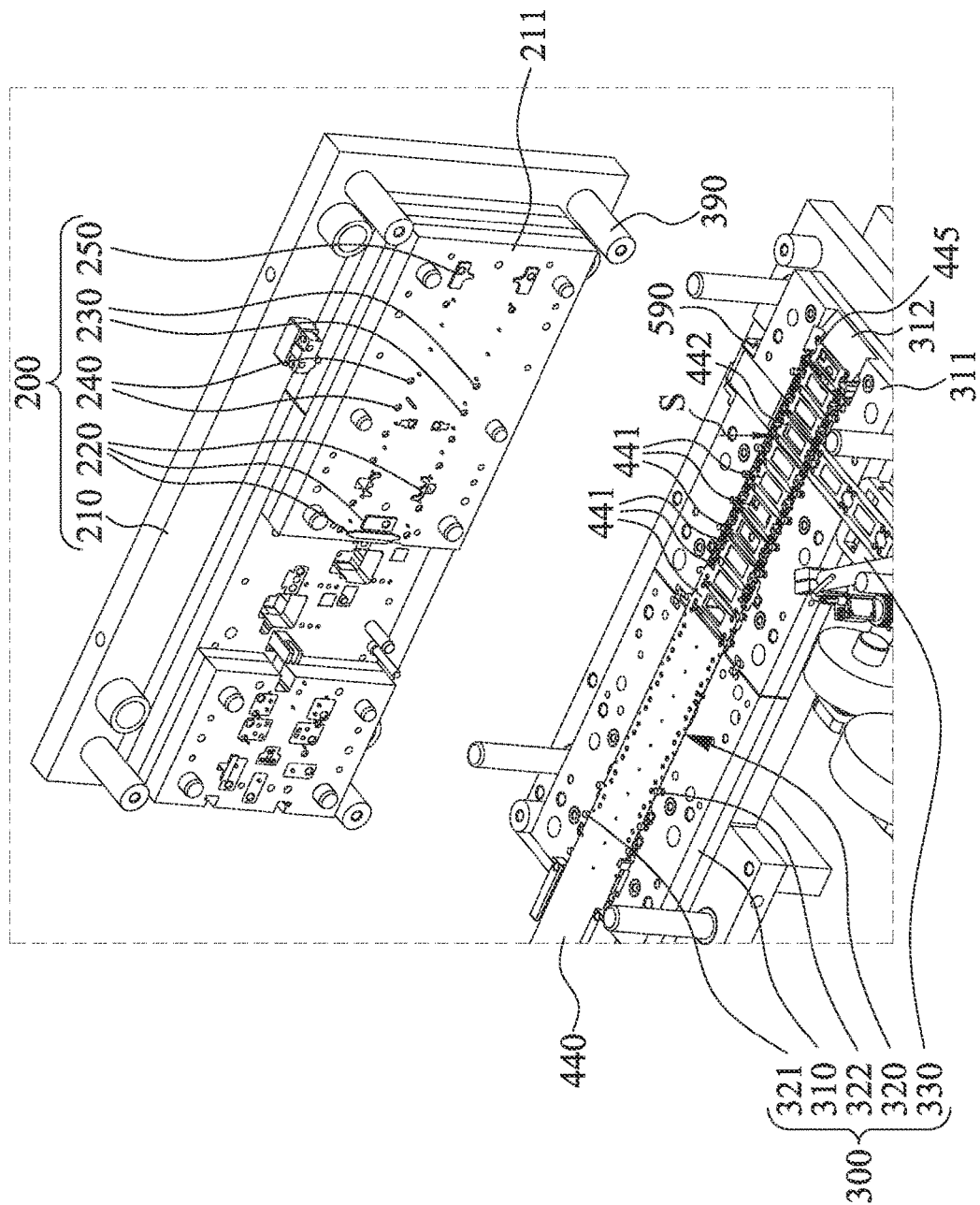
FIG. 3 is a disassembling view of the lower stamping mold and the upper stamping mold of the continual stamping mold group of FIG. 1.

Reference is now made to FIG. 1 to FIG. 3, in which FIG. 1 is a perspective view of a composite automatic production equipment 10 with an in-mold stamping and film-attaching composite process in a mold-opened status according to one embodiment of the present disclosure, FIG. 2 is a perspective view of the composite automatic production equipment 10 in a mold-closed status of FIG. 1, and FIG. 3 is a disassembling view of a lower stamping mold 300 and a upper stamping mold 200 of the continual stamping mold group 100 of FIG. 1. As shown in FIG. 1 and FIG. 2, the composite automatic production equipment 10 includes a continual stamping mold group 100, a punching strip feeding device 400 and an insulating-sheet feeding device 500 and a programmable logic controller system (referred to PLC system hereinafter) 700. The punching strip feeding device 400 continually sends out a punching material strip 440 in a thin plate-shape in a first direction D1, and drives the punching material strip 440 to advance by a first distance unit per time.

The continual stamping mold group 100 includes an upper stamping mold 200 and a lower stamping mold 300 which are able to close to or separate from each other. That is, a punching machine can output physical strength to drive the upper stamping mold 200 and the lower stamping mold 300 to be closed and opened repeatedly along a punching stroke direction H so that the upper stamping mold 200 and the lower stamping mold 300 are able to be closed and opened from each other through guide posts 390. The lower stamping mold 300 includes a lower die plate 310 and a strip-material delivery zone 320 (FIG. 3). The strip-material delivery zone 320 is connected to the lower die plate 310, and spaced with a die surface 311 of the lower die plate 310. The strip-material delivery zone 320 is extended along the first direction D1 so as to serve as a feeding advance path for delivering the punching material strip 440. The upper stamping mold 200 includes an upper die plate 210 and a plurality of punches 220 (FIG. 3). The upper die plate 210 is liftably disposed on the die surface 311 of the lower die plate 310. The punches 220 are disposed on a material-departing plate 211 of the upper die plate 210 facing towards the lower die plate 310, and arranged in sequence along the first direction D1. When the upper die plate 210 and the lower die plate 310 are closed to each other each time, the punches 220 are able to perform a single punching step along the punching stroke direction H so as to synchronously punch out a plurality of semi-finished products 441 having different completion progresses at different positions of the punching material strip 440, respectively. These semi-finished products 441 with different completion progresses are arranged in in sequence a single row along the first direction D1. Among these semi-finished products 441 with different completion progresses, the latest one of the semi-finished products 441 along the first direction D1 is a plate material 442 that is ready to be attached. In the embodiment, each of the semi-finished products 441 is designed to be sequentially formed on the punching material strip 440 by various stamping processes. For example, the above-mentioned plate material 442 is a CPU bracket, and is sequentially completed by multiple punching processes including hole punching, contour punching and element separation. It is noted, when the punching material strip 440 is driven to advance by the first distance unit per time, the punching material strip 440 is driven to advance one distance between any two of the semi-finished products 441 in the strip-material delivery zone 320 each time.

The insulating-sheet feeding device 500 is connected to the lower die plate 310 for continually sending out an insulating-film material strip 600 to the continual stamping mold group 100 in a second direction D2, and the insulating-sheet feeding device 500 drives the insulating-film material strip 600 to advance by a second distance unit per time.

In a specific embodiment, the second direction D2 and the first direction D1 are intersected each other, for example, the second direction D2 and the first direction D1 are orthogonal to each other. More specifically, the insulating-film material strip 600 is presented as a multilayer structure, and includes a main material strip 610 and a plurality of insulating sheet sets 630. The main material strip 610 passes through the lower die plate 310 and the punching material strip 440. The insulating sheet sets 630 are sequentially arranged on the main material strip 610 in a single row.

It is noted, when the insulating-film material strip 600 advances the second distance unit per time, the insulating-film material strip 600 advances one of the insulating sheet sets 630 into the area of the punching material strip and the insulating-film material strip being overlapped with each other every time.

The operation of the PLC system 700 includes the monitoring and controlling program to machines and electrical systems, process operations, controlling working speeds, and integrating electrical connections to the composite automatic production equipment 10, the continual stamping mold group 100, the punching strip feeding device 400 and the insulating-sheet feeding device 500. The punching strip feeding device 400 and the insulating-sheet feeding device 500 are operated with each other in a correct time sequence.

Figure 4:
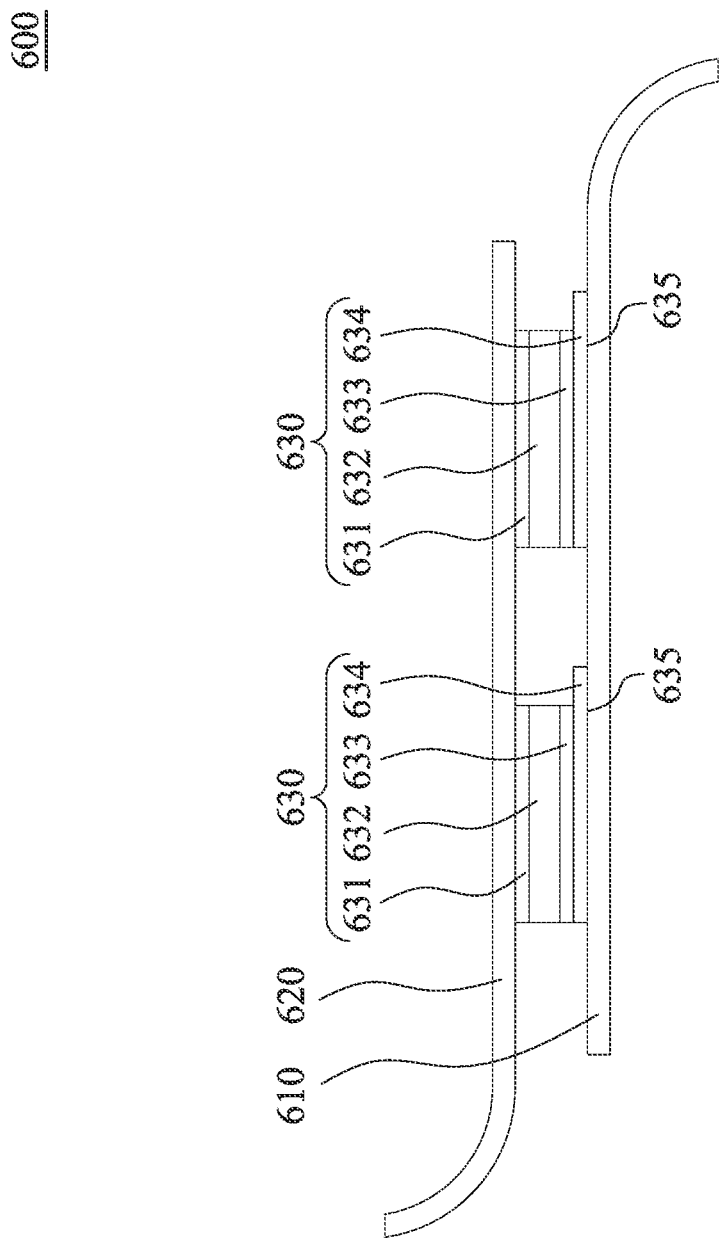
FIG. 4 is a partial longitudinal section view of the insulating-film material strip of FIG. 1.

FIG. 4 is a partial longitudinal section view of the insulating-film material strip 600 of FIG. 1. As shown in FIG. 4, the insulating-film material strip 600 further includes a release tape 620. One surface of each of the insulating sheet sets 630 is adhesive. The insulating sheet sets 630 are separably and linearly arranged to be stacked between the main material strip 610 and the release tape 620, and the insulating sheet sets 630 are spaced arranged in a single row along the second direction D2. These insulating sheet sets 630 are independently tearable from the main material strip 610. Each of the insulating sheet sets 630 includes a mylar sheet 632, an upper adhesive layer 631, a lower adhesive layer 633, and a releasing mylar tape 634. The upper adhesive layer 631 is sandwiched between the mylar sheet 632 and the release tape 620, and the release tape 620 is tearable from the insulating sheet sets 630 through external force. The lower adhesive layer 633 is directly located on one side of the mylar sheet 632 facing away from the release tape 620, and the releasing mylar tape 634 is tearable from the lower adhesive layer 633 through external force. The releasing mylar tape 634 is sandwiched between the lower adhesive layer 633 and the main material strip 610. The releasing mylar tape 634 is attached to the main material strip 610 through a low-sticky layer 635.

It is noted, the main material strip 610 loads the insulating sheet sets 630 through adhesive fashion. However, the disclosure is not limited to this. In other embodiments, the main material strip 610 may load the insulating sheet sets 630 through static electricity, rather than any adhesive.

Figure 7:
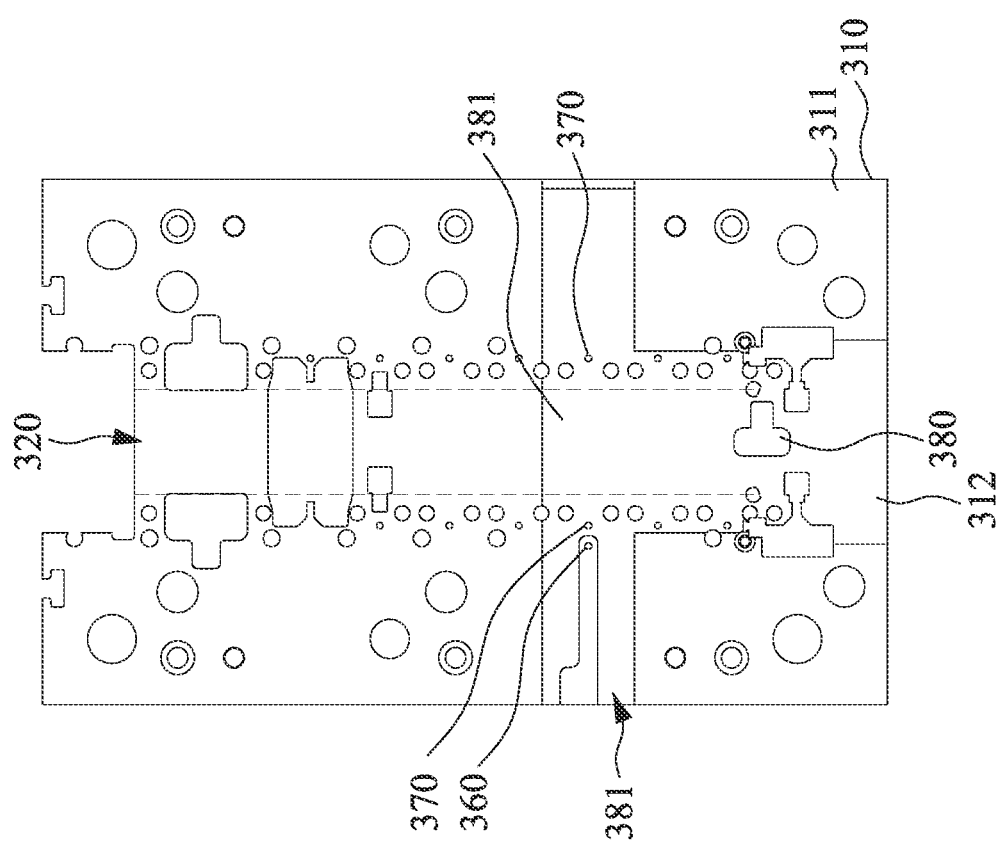
FIG. 7 is a front view showing a concave die of the lower stamping mold of FIG. 3.
Figure 8:
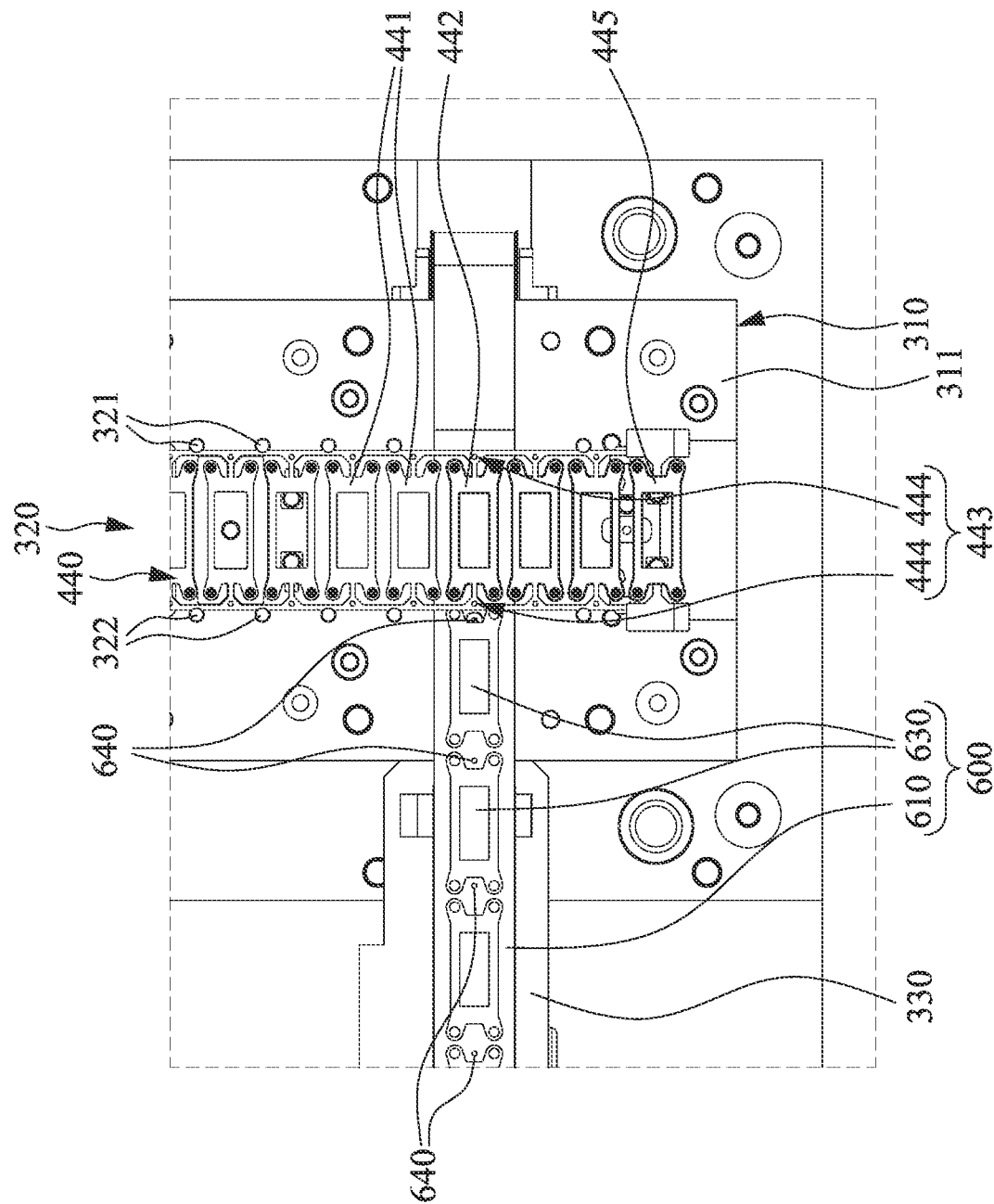
FIG. 8 is a partially enlarged view showing the lower stamping mold being directly observed in a direct-viewing direction S of FIG. 3 when performing a film-attaching step.

Thus, as shown in FIG. 2, FIG. 7 and FIG. 8, the die surface 311 of the lower stamping mold 300 is formed with a concave die 381. Whenever the punching material strip 440 and the insulating-film material strip 600 are respectively delivered in the concave die 381, one of the insulating sheet sets 630 is overlapped with the plate material 442 so as to form a vertical gap therebetween, and when each of two sets of second optical sensors 370 (FIG. 7) is overlapped and aligned with at least one first feature sensing point 640 (FIG. 8) so as to send out signals to the PLC system 700, the PLC system 700 sends a mold closing signal to the composite automatic production equipment 10, so that the upper die plate 210 and the lower die plate 310 are closed along the stamping stroke H, the corresponding insulating sheet set 630 of the insulating-film material strip 600 can be adhered on the aforementioned plate material 442 through the upper adhesive layer 631 so as to produce a finished product 445 (FIG. 1).

On the contrary, as shown in FIG. 2, whenever the upper stamping mold 200 is ascended to the original position relative to the lower stamping mold 300, that is, when the upper die plate 210 and the lower die plate 310 are separated, the lower stamping mold 300 pushes the punching material strip 440 away from the insulating-film material strip 600. Since the adhesive force of the upper adhesive layer 631 is greater than the adhesive force of the low-sticky layer 635 of the releasing mylar tape 634, the insulating sheet sets 630 adhered to the plate material 442 is independently torn from the main material strip 610. Thus, the punching strip feeding device 400 and the insulating-sheet feeding device 500 are able to continually send out the corresponding punching material strip 440 and insulating-film material strip 600.

Specifically, as shown in FIG. 1, the punching strip feeding device 400 includes a punching-strip winding bracket 410, a leveling machine 420 and two material feeding rollers 430. The leveling machine 420 is located between the punching-strip winding bracket 410 and the material feeding rollers 430. The punching material strip 440 is previously wound that is rotatably located on the punching-strip winding bracket 410 so that the punching material strip 440 can be sent into the continual stamping mold group 100. The material feeding rollers 430 are located between the punching-strip winding bracket 410 and the continual stamping mold group 100 for sandwiching the punching material strip 440 to continually feeding the punching material strip 440 to advance in the first direction D1. In this embodiment, the material feeding rollers 430 are driven by a power device (not shown in figures), so that the material feeding rollers 430 respectively rotate in opposite directions to each other, so as to continuously feed the punching material strip 440 to move in the first direction D1. These material feeding rollers 430 push the punching material strip 440 to advance the first distance unit at equal steps every time interval (e.g., 0.5-0.7 seconds), however, the present disclosure is not limited to this.

Furthermore, the lower stamping mold 300 further includes a plurality of strip-holding floating guide tips divided into first strip-holding floating guide tips 321 and second strip-holding floating guide tips 322 (FIG. 3). The first strip-holding floating guide tips 321 are located on the die surface 311 of the lower die plate 310, and spaced arranged in a single row along the first direction D1. Each of the first strip-holding floating guide tips 321 is pivotally located at the die surface 311 of the lower die plate 310. The second strip-holding floating guide tips 322 are located on the die surface 311 of the lower die plate 310, and spaced arranged in a single row along the first direction D1. Each of the second strip-holding floating guide tips 322 is pivotally located at the die surface 311 of the lower die plate 310. The strip-holding floating guide tips (i.e., the first strip-holding floating guide tips 321 and the second strip-holding floating guide tips 322) are spaced arranged on the die surface 311 of the lower die plate 310 in two rows along the first direction. Since the first strip-holding floating guide tips 321 and the second strip-holding floating guide tips 322 are arranged linearly side by side, the aforementioned strip-material delivery zone 320 is defined between the first strip-holding floating guide tips 321 and the second strip-holding floating guide tips 322. Two opposite sides of the punching material strip 440 are respectively in contact with the first strip-holding floating guide tips 321 and the second strip-holding floating guide tips 322 such that the punching material strip 440 can be floated above the die surface 311 of the lower die plate 310 between the first strip-holding floating guide tips 321 and the second strip-holding floating guide tips 322 so as to be stably delivered in the first direction D1.

Figure 5C:
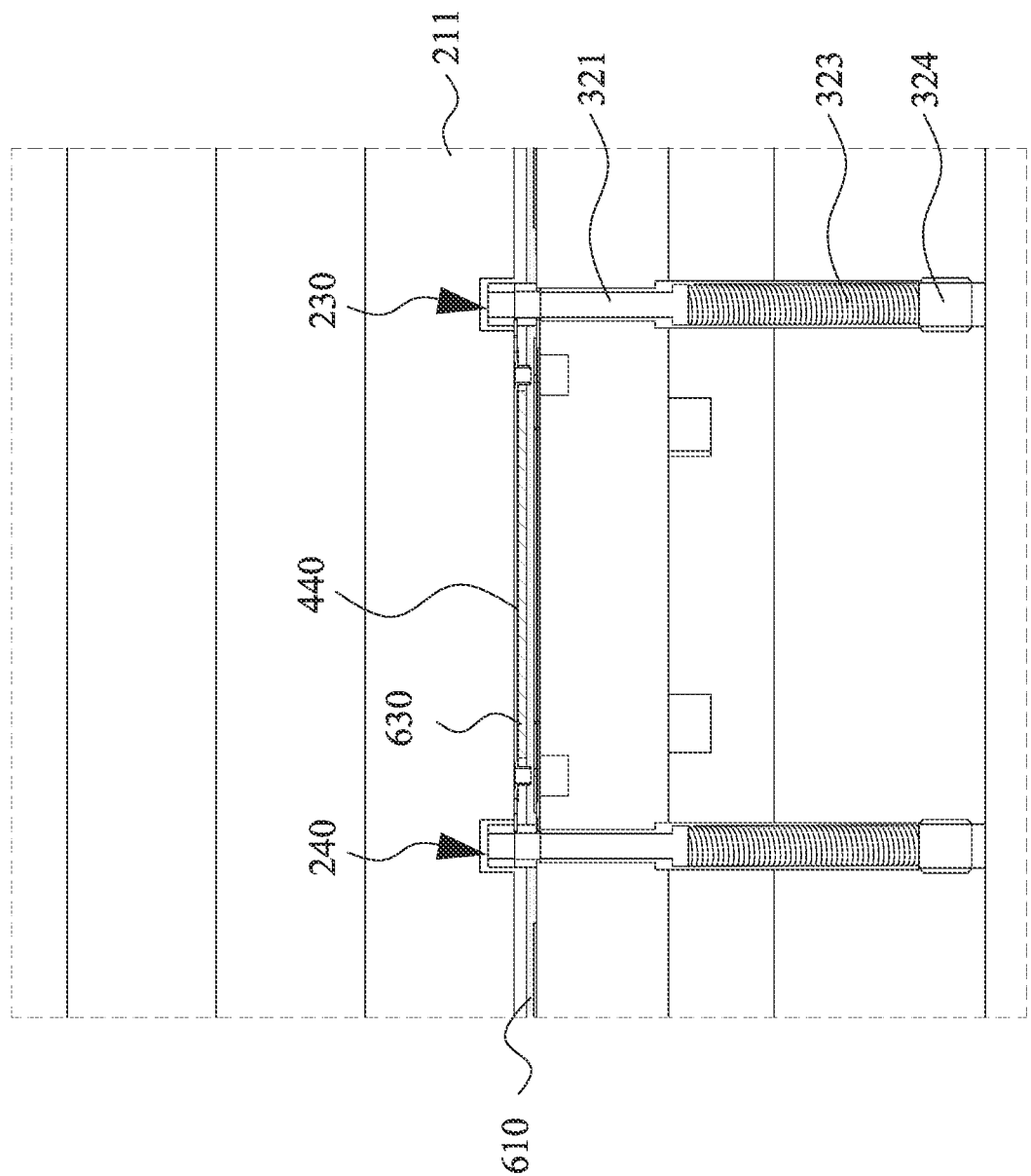

Reference is now made to FIG. 5A to FIG. 5D, in which FIG. 5A is a partial cross-sectional view of a strip-holding floating guide tip assembly of the continual stamping mold group 100 of FIG. 1, and FIG. 5B to FIG. 5D are continual operational schematic views of the strip-holding floating guide tip assembly in a zone M of FIG. 5A from the mold-closed status to the mold-opened status. As shown in FIG. 3 and FIG. 5A, the upper stamping mold 200 further includes a plurality of first tip-receiving holes 230 and a plurality of second tip-receiving holes 240. The first tip-receiving holes 230 are spaced arranged on the material-departing plate 211 of the upper die plate 210 along the first direction D1. The second tip-receiving holes 240 are spaced arranged on the material-departing plate 211 of the upper die plate 210 along the first direction D1. The first strip-holding floating guide tips 321 are respectively arranged corresponding to the first tip-receiving holes 230, and the second strip-holding floating guide tips 322 are respectively arranged corresponding to the second tip-receiving holes 240. Each of the first strip-holding floating guide tips 321 is assembled with a floating spring 323 and a stop screw 324. Each of the second strip-holding floating guide tips 322 is assembled with another floating spring 323 and another stop screw 324. The function of the floating spring 323 is to maintain an elastic space for the first/second floating guide tips 321/322 to ascend and descend. After the punching material strip 440 is positioned, when the punching material strip 440 is continually pressed to cover the die surface 311, the plate material 442 of the punching material strip 440 is pressed to the corresponding insulating sheet set 630 (FIG. 5C).

As shown in FIG. 5B and FIG. 5C, when the punching machine drives the upper die plate 210 to be pressed down onto the lower die plate 310 as entering the mold-closed status, each of the first strip-holding floating guide tips 321 exactly inserts into the corresponding one of the first tip-receiving holes 230, and each of the second strip-holding floating guide tips 322 exactly inserts into the corresponding one of the second tip-receiving holes 240, and the corresponding insulating sheet set 630 is adhered on the plate material 442 of the punching material strip 440 at the same time.

On the contrary, as shown in FIG. 5C and FIG. 5D, when the punching machine drives the upper die plate 210 to be lifted up from the lower die plate 310 as entering the mold-opened status, each of the first strip-holding floating guide tips 321 exactly withdraws from the corresponding one of the first tip-receiving holes 230, and each of the second strip-holding floating guide tips 322 exactly withdraws from the corresponding one of the second tip-receiving holes 240. Due to the rebound force produced by the floating springs 323, the corresponding first and second strip-holding floating guide tips 321 and 322 are pushed upwardly, such that the punching material strip 440 is pushed upwardly through the corresponding first and second strip-holding floating guide tips 321 and 322. At this moment, the insulating sheet set adhered on the above-mentioned plate material 442 can be torn off from the main material strip 610 (FIG. 5D)

Figure 6:
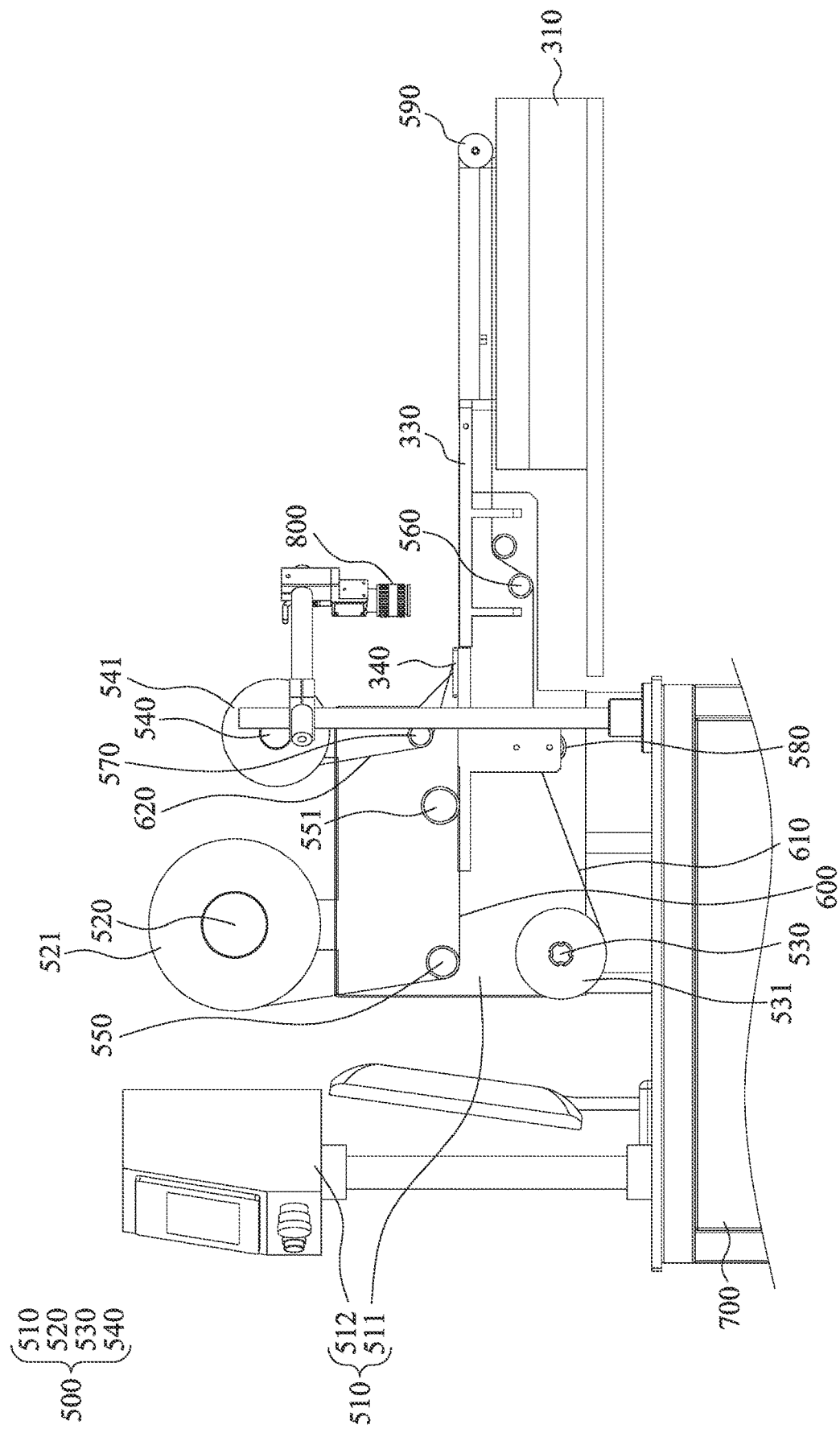
FIG. 6 is a side view of the insulating-sheet feeding device of FIG. 1.

FIG. 6 is a side view of the insulating-sheet feeding device 500 of FIG. 1. As shown in FIG. 1 and FIG. 6, the insulating-sheet feeding device 500 includes a material-feeding mainframe 510, an insulating-sheet roller 520, a strip-collecting roller 530 and a release-tape collecting roller 540. The material-feeding mainframe 510 includes a housing 511 and a controller 512. The housing 511 of the material-feeding mainframe 510 is disposed on one side of the lower stamping mold 300. The insulating-sheet roller 520 is pivotally connected to the housing 511 of the material-feeding mainframe 510, and used to gradually rotate the insulating-film material strip 600 previously wound on the insulating-sheet roller 520 as a first roll body 521 to continually send the insulating-film material strip 600 to the die surface 311 of the lower die plate 310. The insulating-sheet roller 520 sends out the insulating-film material strip 600 in accordance with a first rotation speed. The strip-collecting roller 530 is pivotally connected to the housing 511 of the material-feeding mainframe 510, and used to gradually wind and collect a part of the main material strip 610 already passed through the lower die plate 310 and the punching material strip 440 as a second roll body 531 in accordance with the first rotation speed of the insulating-sheet roller 520. The strip-collecting roller 530 is rotated to collect the main material strip 610 in accordance with a second rotation speed. The release-tape collecting roller 540 is pivotally connected to the material-feeding mainframe 510, and used to wind the release tape 620 thereon to be a third roll body.

Also, the insulating-sheet feeding device 500 includes a first tension sensing roller 550, a second tension sensing roller 560 and a third tension sensing roller 570. The first tension sensing roller 550 is pivotally connected to the housing 511 of the material-feeding mainframe 510, and used to direct a conveyance direction of the insulating-film material strip 600 and currently obtain a first tension of the insulating-film material strip 600. The second tension sensing roller 560 is pivotally connected to the material-feeding mainframe 510, and disposed between the lower die plate 310 and the strip-collecting roller 530, and used to direct a conveyance direction of the part of the main material strip 610 and currently obtain a second tension of the main material strip 610. The third tension sensing roller 570 is pivotally connected to the material-feeding mainframe 510, and used to direct a conveyance direction of the release tape 620 and currently obtain a third tension of the release tape 620. The controller 512 of the material-feeding mainframe 510 is electrically connected to the first tension sensing roller 550, the second tension sensing roller 560 and the third tension sensing roller 570 for adjusting the first rotation speed of the insulating-sheet roller 520 according to the first tension, adjusting the second rotation speed of the strip-collecting roller 530 according to the second tension, and for adjusting the third rotation speed of the release-tape collecting roller 540 according to the third tension.

The lower stamping mold includes an insulating-sheet holder 330 and a release-tape tearing plate 340. The insulating-sheet holder 330 is connected to the die surface 311 of the lower die plate 310, and used to support the main material strip 610 and the insulating sheet sets 630. The insulating-sheet holder 330, the strip-collecting roller 530 and the insulating-sheet roller 520 are disposed on the side of the lower stamping mold 300. The release-tape tearing plate 340 is disposed on the insulating-sheet holder 330, and the release-tape tearing plate 340 is provided with a guiding slope that is used to guide the release tape 620 to be sent to the release-tape collecting roller 540.

Thus, when the insulating-sheet roller 520 sends out the insulating-film material strip 600, the advance tension of the insulating-film material strip 600 can be adjusted through the first tension sensing roller 550, the insulating-film material strip 600 can be leveled by the leveling roller 551 so that the insulating-film material strip 600 is allowed to move smoothly and quickly on the insulating-sheet holder 330. After the which loads the insulating sheet sets 630 advances through between the concave die 381 and the punching material strip 440, the advance direction of the main material strip 610 is reversed 180 degrees through the rotating roller 590 to pass through below the lower die plate 310. Then, after the tension of the main material strip 610 is adjusted, the main material strip 610 is finally collected on the strip-collecting roller 530 through the responds to the first tension sensing roller 550 and one pair of guiding rollers 580. Furthermore, before the insulating-film material strip 600 passes through between the insulating-sheet holder 330 and the punching material strip 440, the release tape 620 is gradually torn from the main material strip 610 through the release-tape tearing plate 340 by response of the release-tape collecting roller 540 and the first tension sensing roller 550. The release tape 620 is gradually torn to show the main material strip 610 and the insulating sheet sets 630 linearly arranged on the main material strip 610 so as to be recycled as the third roll body. During the unwinding and rewinding of the insulating-film material strip 600, the roll diameter of the first roll body will continue to change, and the tension of the first roll body will be changed in response to the change of the roll diameter. In addition, when the insulating film material strip 600 is unwounded to pull out along the first direction, the change of tension may cause the tape to be stretched or contracted, and the tape may be stuck or squeezed. Therefore, only relying on the synchronized drive to the rewinding and unwinding rollers cannot keep the tension of the above-mentioned material tape always stable and consistent, thereby, the tension of the roll body of the material tape must be controlled.

In this way, in order to avoid unsynchronized collocation of the insulating-sheet roller 520 and the strip-collecting roller 530 thereby respectively causing wrinkles, slacks, curls or even breaks on the first roll body 521 and the second roll body 531, the controller 512 of the material-feeding mainframe 510 adjusts the first rotation speed of the insulating-sheet roller 520 and the first tension of the insulating-film material strip 600 according to the change of the roll diameter of the first roll body 521, and adjusts the second rotation speed of the strip-collecting roller 530 and the second tension of the main material strip 610 according to the change of the roll diameter of the second roll body 531.

In addition, the composite automatic production equipment 10 further includes an image sensor 800. The image sensor 800 captures images from the insulating-film material strip 600, and matches and inspects the insulating-film material strip 600 with an image comparison fashion.

FIG. 7 is a front view showing a concave die of the lower die plate 310 of FIG. 3. FIG. 8 is a partially enlarged view showing the lower die plate 310 being directly observed in a direct-viewing direction S of FIG. 3 when performing a film-attaching step. As shown in FIG. 7 and FIG. 8, the insulating-film material strip 600 further includes a plurality of first characteristic sensing points 640. The first feature sensing points 640 are periodically spaced arranged along the second direction D2 in order, and each of the first feature sensing points 640 is located at the main material strip 610 between any two adjacent insulating sheet sets 630. In this embodiment, the first feature sensing points 640 is the sensing point on the main material strip 610. However, the disclosure is not limited to this. In other embodiments, the first feature sensing points 640 may also be a light-shielding pattern.

The punching material strip 440 has a plurality of identification feature groups 443, and the identification feature groups 443 are sequentially and equidistantly arranged on the punching material strip 440 along the first direction D1. Each of the identification feature groups 443 includes two second feature induction points 444, and the plate material 442 is disposed between the second feature induction points 444 of the same identification feature group 443. In this embodiment, each of the second feature induction points 444 is the sensing point of the punching material strip 440 (e.g., a through hole or a printed pattern). However, the disclosure is not limited to this. In other embodiments, each of the second feature induction points 444 may also be a light-shielding pattern.

The lower stamping mold further includes a first optical sensor 360 and two second optical sensors 370 (FIG. 7). The first optical sensor 360 is disposed on the concave die 381 of the lower die plate 310, between the strip-material delivery zone 320 and the insulating-sheet holder 330 (or the insulating-sheet feeding device 500). The second optical sensors 370 are spaced arranged on the die surface 311 of the lower die plate 310, and disposed at one area of the punching material strip 440 and the insulating-film material strip 600 being overlapped with each other. In this embodiment, the first optical sensor 360 and the second optical sensors 370 (FIG. 7) respectively are optical fiber sensors, however, the disclosure is not limited to the type of optical sensor.

In this way, when the insulating-film material strip 600 advances to the concave die 381 on the lower die plate 310, so that the first optical sensor 360 senses and aligns with the sensing point on the main material strip 610, the first optical sensor 360 emits feedback signals to the PLC system 700. Therefore, the PLC system 700 controls the punching machine to drive the upper die plate 210 and the lower die plate 310 to separate in the mold-opened status according to the feedback signals.

Furthermore, when the punching material strip 440 is sent to advance in the strip-material delivery zone 320, and the second optical sensors 370 respectively sense and align to the second feature induction points 444 of the punching material strip 440, since the plate material 442 is overlapped with one of the insulating sheet sets 630, accordingly, the PLC system 700 controls the punching machine to drive the upper die plate 210 and the lower die plate 310 to close together in the mold-closed status.

Back to FIG. 1 and FIG. 2, the lower stamping mold 300 further includes an ejector device 380. The ejector device 380 is extendable on the die surface 311 of the lower die plate 310, and is located in the strip-material delivery zone 320. In this way, when the upper die plate 210 and the lower die plate 310 are separate to enter the mold-opened status, the PLC system 700 controls the ejector device 380 to respectively extend from the die surface 311 of the lower die plate 310, so that the ejector device 380 can push and eject the finished product 445 away from the die surface 311 of the lower die plate 310.

As shown in FIG. 1, the lower stamping mold 300 further includes a finished-product guiding portion 312 (e.g., a slope surface). The finished-product guiding portion 312 of the lower stamping mold 300 is disposed on one end of the die surface 311 of the lower die plate 310 away from the punching strip feeding device 400. The upper stamping mold 200 further includes a plurality of separating punches 250 dispose on the material-departing plate 211 of the upper die plate 210.

Thus, when the upper die plate 210 and the lower die plate 310 are closed as entering the mold-closed status, the separating punches 250 can immediately break the plate material 442 from the punching material strip 440 totally. Thus, the plate material 442 totally separated from the punching material strip 440 can be dropped into a non-defective zone (not shown) through the finished-product guiding portion 312.

Thus, through the construction of the embodiments above, the present disclosure does not need to transfer the semi-finished products to another work station for film-attaching process, that is, the film-attaching process can be completed synchronously in the stamping process. Therefore, not only the operating efficiency of the in-mold placement process can be improved, but also the operating cost can be reduced, and the delivery period can be shortened.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A composite automatic production equipment for in-mold placement process, comprising:
   a punching strip feeding device for continually sending out a punching material strip in a first direction;
   a continual stamping mold group comprising:
      a lower stamping mold comprising a lower die plate having a die surface, and a strip-material delivery zone that is connected to the lower die plate and spaced with the die surface of the lower die plate for providing the punching material strip to delivery therein, wherein the punching material strip in the strip-material delivery zone is spaced with the die surface of the lower die plate; and
      an upper stamping mold comprising an upper die plate liftably disposed on the lower die plate, and a plurality of punches disposed on a material-departing plate of the upper die plate facing towards the die surface of the lower die plate for synchronously punching out a plurality of semi-finished products arranged in sequence on the punching material strip when the upper die plate and the lower die plate are closed; and an insulating-sheet feeding device connected to the lower die plate for continually sending out an insulating-film material strip to the continual stamping mold group in a second direction intersecting to the first direction so that the insulating-film material strip is between the die surface of the lower die plate and the punching material strip, wherein the insulating-film material strip comprises a main material strip passing through the lower die plate and the punching material strip, and a plurality of insulating sheet sets which are adhesive and detachably arranged along the main material strip, wherein when the upper die plate and the lower die plate are closed, and one of the semi-finished products overlaps with one of the insulating sheet sets, the punching material strip is pressed down to the insulating-film material strip by the upper die plate, so that the one of the insulating sheet sets and the one of the semi-finished products overlapped with each other are adhered together, when the upper die plate and the lower die plate are separated, the one of the insulating sheet sets adhered on the one of the semi-finished products is torn off from the main material strip of the insulating-film material strip.

2. The composite automatic production equipment for in-mold placement process of claim 1, wherein the insulating-sheet feeding device comprises:

a material-feeding mainframe disposed on one side of the lower stamping mold;

an insulating-sheet roller pivotally connected to the material-feeding mainframe, and configured to gradually rotate the insulating-film material strip previously wound on the insulating-sheet roller as a first roll body to continually send the insulating-film material strip to the lower die plate, wherein the insulating-sheet roller sends out the insulating-film material strip in accordance with a first rotation speed; and a strip-collecting roller pivotally connected to the material-feeding mainframe, and configured to gradually wind a part of the main material strip already passed through the lower die plate and the punching material strip as a second roll body in accordance with the first rotation speed of the insulating-sheet roller, wherein the strip-collecting roller winds and collects the main material strip in accordance with a second rotation speed.

3. The composite automatic production equipment for in-mold placement process of claim 2, wherein the insulating-sheet feeding device comprises:

a first tension sensing roller pivotally connected to the material-feeding mainframe, and configured to direct a conveyance direction of the insulating-film material strip, and currently obtain a first tension of the insulating-film material strip; and a second tension sensing roller pivotally connected to the material-feeding mainframe, disposed between the lower die plate and the strip-collecting roller, and configured to direct a conveyance direction of the part of the main material strip, and currently obtain a second tension of the main material strip, wherein the material-feeding mainframe is electrically connected to the first tension sensing roller and the second tension sensing roller for adjusting the first rotation speed of the insulating-sheet roller according to the first tension, and adjusting the second rotation speed of the strip-collecting roller according to the second tension.

4. The composite automatic production equipment for in-mold placement process of claim 2, wherein the insulating-film material strip further comprises a release tape, and the insulating sheet sets are linearly arranged to be stacked between the main material strip and the release tape; and the insulating-sheet feeding device further comprises a release-tape collecting roller pivotally connected to the material-feeding mainframe, and configured to gradually tear the release tape off from the insulating-film material strip to show the main material strip and the insulating sheet sets such that the release-tape collecting roller is allowed to gradually wind the release tape thereon to be a third roll body, wherein the release-tape collecting roller is rotated to collect the release tape in accordance with a third rotation speed.

5. The composite automatic production equipment for in-mold placement process of claim 4, wherein the lower stamping mold comprises:

an insulating-sheet holder connected to the lower die plate, and configured to support the main material strip and the insulating sheet sets, wherein the insulating-sheet holder, the strip-collecting roller and the insulating-sheet roller are disposed on the one side of the lower stamping mold; and a release-tape tearing plate disposed on the insulating-sheet holder, provided with a guiding slope that is used to guide the release tape to be sent to the release-tape collecting roller.

6. The composite automatic production equipment for in-mold placement process of claim 4, wherein the insulating-sheet feeding device further comprises a third tension sensing roller pivotally connected to the material-feeding mainframe, and configured to direct a conveyance direction of the release tape, and obtain a third tension of the release tape, wherein the material-feeding mainframe is electrically connected to the third tension sensing roller for adjusting the third rotation speed of the release tape according to the third tension.

7. The composite automatic production equipment for in-mold placement process of claim 1, wherein the lower stamping mold comprises:

plurality of strip-holding floating guide tips respectively pivotally located on the die surface of the lower die plate, and spaced arranged in two rows along the first direction, and each of the strip-holding floating guide tips is installed at the lower die plate with one floating spring, wherein the punching material strip is suspended and held between the two rows of the strip-holding floating guide tips, so that a vertical gap is formed between the punching material strip and the insulating-film material strip.

8. The composite automatic production equipment for in-mold placement process of claim 7, wherein the upper stamping mold comprises:

a plurality of tip-receiving holes respectively arranged on the material-departing plate of the upper die plate, spaced arranged in two rows along the first direction, and configured to separately receive the strip-holding floating guide tips and press the floating springs to produce rebound forces when the upper die plate and the lower die plate are closed, wherein when the upper die plate and the lower die plate are separated, the strip-holding floating guide tips are removed from the tip-receiving hole, and the strip-holding floating guide tips lift the punching material strip upwards from the die surface of the lower die plate by the rebound forces of the floating springs so as to tear the one of the insulating sheet sets adhered on the one of the semi-finished products from the main material strip.

9. The composite automatic production equipment for in-mold placement process of claim 1, wherein the insulating-film material strip further comprises at least one first feature sensing point located between any two adjacent one of the insulating sheet sets;
   the punching material strip comprises two second feature induction points, and each of the semi-finished products is disposed between the second feature induction points; and
   the lower stamping mold further comprises:
      a first optical sensor disposed on the die surface of the lower die plate, between the strip-material delivery zone and the insulating-sheet feeding device; and
      two second optical sensors spaced arranged on the die surface of the lower die plate, and disposed at one area of the punching material strip and the insulating-film material strip being overlapped with each other, wherein when the insulating-film material strip is moved to the die surface of the lower die plate such that the at least one first feature sensing point is sensed by the first optical sensor, in response of that, the upper die plate and the lower die plate are instructed to be separated, when the one of the semi-finished products is overlapped with the one of the insulating sheet sets, such that the two second feature induction points are sensed by the two second optical sensors at the same time, in response of that, the upper die plate and the lower die plate are instructed to be closed.

10. The composite automatic production equipment for in-mold placement process of claim 1, wherein the lower stamping mold further comprises a separating punch located on the material-departing plate of the upper die plate, wherein when the upper die plate and the lower die plate are closed, the separating punch breaks the one of the semi-finished products adhered with the one of the insulating sheet sets from the punching material strip totally.

\* \* \* \* \*